(12) United States Patent
Maus et al.

(10) Patent No.: US 10,843,705 B2
(45) Date of Patent: Nov. 24, 2020

(54) METHOD AND DEVICE FOR ENVIRONMENT-BASED ADAPTATION OF DRIVER ASSISTANCE FUNCTIONS

(71) Applicant: FORD GLOBAL TECHNOLOGIES, LLC, Dearborn, MI (US)

(72) Inventors: Benjamin Maus, Duesseldorf (DE); Reid James Steiger, Franklin, MI (US); Andreas Meyer, Kuerten (DE); Manuel Merz, Montabaur (DE); Guido Weitkus, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 16/039,673

(22) Filed: Jul. 19, 2018

(65) Prior Publication Data
US 2019/0023280 A1  Jan. 24, 2019

(30) Foreign Application Priority Data

Jul. 21, 2017  (DE) .................. 10 2017 212 607

(51) Int. Cl.
*B60W 50/08*  (2020.01)
*G06N 5/04*  (2006.01)
(Continued)

(52) U.S. Cl.
CPC .......... *B60W 50/085* (2013.01); *B60W 30/16* (2013.01); *B60W 50/00* (2013.01);
(Continued)

(58) Field of Classification Search
CPC .. B60W 50/14; B60W 2420/42; B60W 30/14; B60W 10/04; B60W 2050/146; B60W 2420/52; B60W 30/09
See application file for complete search history.

(56) References Cited

U.S. PATENT DOCUMENTS 7,440,823 B2 * 10/2008 Yamamura ............ B60T 7/12
180/168
9,238,467 B1 * 1/2016 Hoye .................... B60W 50/14
(Continued)

FOREIGN PATENT DOCUMENTS

| DE | 102005009146 A1 | 9/2006 |
| DE | 102015010270 A1 | 2/2017 |
| DE | 102015201588 A1 | 2/2017 |

OTHER PUBLICATIONS

Aditya, K. et al. Detecting Sudden Pedestrian Crossings and Avoiding Accidents Using Arm 11. Int. Journal of Engineering Research and Applications. Sep.-Oct. 2013. vol. 3, Issue 5. 4 pages.
(Continued)

*Primary Examiner* — Redhwan K Mawari
(74) *Attorney, Agent, or Firm* — Brooks Kushman P.C.; Frank Lollo

(57) ABSTRACT

A method is disclosed to operate a motor vehicle using a driver assistance system. The driver assistance system includes, for at least one driver assistance system function, at least one criterion relating to a vehicle environment. The at least one criterion is defined for an adaptation of the driver assistance system function, a number of features of the environment of the vehicle are detected, a probability of the occurrence of at least one criterion is estimated on the basis of a combination of the detected features, and the driver assistance system function is adapted on the basis of the estimated probability.

19 Claims, 8 Drawing Sheets

(51) Int. Cl.
*B60W 30/16* (2020.01)
*B60W 50/00* (2006.01)
*G05D 1/00* (2006.01)
*G06N 7/00* (2006.01)
*G06N 5/00* (2006.01)

(52) U.S. Cl.
CPC ........... *G05D 1/0088* (2013.01); *G06N 5/046* (2013.01); *G06N 7/005* (2013.01); *B60W 2050/0088* (2013.01); *B60W 2420/42* (2013.01); *B60W 2420/52* (2013.01); *B60W 2420/60* (2013.01); *B60W 2554/00* (2020.02); *B60W 2710/305* (2013.01); *G05D 2201/0213* (2013.01); *G06N 5/003* (2013.01)

(56) References Cited

U.S. PATENT DOCUMENTS

| | | | | |
|---|---|---|---|---|
| 9,463,806 | B2* | 10/2016 | Rebhan | B60W 50/06 |
| 2003/0205661 | A1* | 11/2003 | Schofield | |
| 2004/0039523 | A1* | 2/2004 | Kainuma | |
| 2007/0213905 | A1* | 9/2007 | Funk | B60K 28/02 |
| | | | | 701/45 |
| 2009/0208058 | A1* | 8/2009 | Schofield | B60Q 9/008 |
| | | | | 348/148 |
| 2012/0271540 | A1* | 10/2012 | Miksa | |
| 2015/0025787 | A1* | 1/2015 | Lehner | |
| 2015/0269829 | A1* | 9/2015 | Birnie | |
| 2015/0344027 | A1* | 12/2015 | Oooka | B60W 50/14 |
| | | | | 701/408 |
| 2016/0176397 | A1* | 6/2016 | Prokhorov | G05D 1/0214 |
| | | | | 701/25 |
| 2016/0272201 | A1* | 9/2016 | Kang | G08G 1/096775 |
| 2017/0088175 | A1* | 3/2017 | Okuda | B62D 6/00 |
| 2017/0242435 | A1* | 8/2017 | Nilsson | B60W 30/16 |
| 2018/0154903 | A1* | 6/2018 | Song | B60K 28/02 |
| 2018/0194365 | A1* | 7/2018 | Bae | |
| 2018/0319402 | A1* | 11/2018 | Mills | B60W 40/06 |
| 2019/0023280 | A1* | 1/2019 | Maus | B60W 30/162 |

OTHER PUBLICATIONS

Seunghyuk; C. et al. Advanced driver-assistance systems: Challenges and opportunities ahead. McKinsey & Company Semiconductors. Feb. 2016. 16 pages.

Driver Assistance Systems. Bosch Mobility Solutions. 2 pages.

* cited by examiner

METHOD AND DEVICE FOR ENVIRONMENT-BASED ADAPTATION OF DRIVER ASSISTANCE FUNCTIONS

CROSS-REFERENCE TO RELATED APPLICATIONS

This application claims foreign priority benefits under 35 U.S.C. § 119(a)-(d) to DE Application 10 2017 212 607.8 filed Jul. 21, 2017, which is hereby incorporated by reference in its entirety.

TECHNICAL FIELD

The present disclosure relates to a method to operate a motor vehicle using a driver assistance system. The disclosure furthermore relates to a device that adapts a driver assistance system function, and a motor vehicle.

BACKGROUND

Driver assistance systems support a driver in order to improve driving comfort and/or safety when driving. Respective ambient conditions and characteristics of respective vehicle environment are important input variables for individual available functions. For example, hands-off driving should be available only if no pedestrians are located in the vicinity. A vehicle should furthermore switch from a stationary state to a use of an ACC ("Automatic Cruise Control") stop-and-go only if a roadway in front of the vehicle is free from pedestrians or obstacles.

Responses of driver assistance functions to ambient situations may, in principle, be influenced by unwanted behavior or risks. A vehicle may thus, for example, steer into a pedestrian without the driver having given cause to do so. In a different example, the ACC stop-and-go may follow an initial target vehicle, but a pedestrian appears on the roadway located in front of the vehicle and is put in danger.

One possibility for handling these situations is use of electronic horizon (EH) information or information of the electronic horizon relating to the environment. Assumptions that reduce an actual occurrence of aforementioned risks can be made on the basis of this information. A probability of pedestrians on a highway, for example, is very low, since pedestrians are essentially not allowed on a highway.

However, electronic horizon information has conceptual disadvantages. The electronic horizon does not respond to short-term changes in an environment, for example newly set up roadworks. Quality and reliability of electronic horizon information may furthermore differ for different areas, in particular electronic horizon information may be different in the USA compared with, for example, China. In addition, use of an electronic horizon system incurs additional costs for a driver assistance product.

A need therefore exists for solutions that provide an alternative to an electronic horizon system, and exclude or at least reduce the aforementioned risks.

Hitherto known driver assistance systems are disclosed, for example, in US 2016/0272201 A1, U.S. Pat. No. 9,238,467, US 2016/0176397 A1, U.S. Pat. No. 9,463,806 and US 2015/0344027 A1. In US 2016/0272201 A1, environment information is acquired in real time and setting values of control logic of the driver assistance system are changed accordingly. In document U.S. Pat. No. 9,238,467, data associated with one or more events are received via an input interface, an associated risk is evaluated and corresponding state changes of the driver assistance system are carried out. In document US 2016/0176397 A1, an alternative travel route for autonomous driving is determined for avoidance of risks arising due to oncoming objects, wherein continuing safe autonomous driving is maintained. In document U.S. Pat. No. 9,463,806, decision signals are generated through evaluations of acquired sensor signals, and are further processed in an autonomous driver assistance system. In document US 2015/0344027 A1, an environment observation system is implemented for detecting an environment of a travelling area. The environment detection unit comprises a radar sensor and an imaging device.

SUMMARY

Against this background, an object of the present disclosure is to provide an advantageous method to operate a motor vehicle using a driver assistance system. A further object is to provide a corresponding device and a corresponding advantageous motor vehicle.

The method, according to the disclosure, to operate a motor vehicle using a driver assistance system comprises, for at least one driver assistance system function, defining at least one criterion relating to a vehicle environment for the adaptation (e.g. availability, behavior, calibration, parameterization) of the driver assistance system function. The method also includes detecting a number of features of the environment of the vehicle. The method further includes estimating a probability of an occurrence of at least one criterion on the basis of a combination of detected features. The method further includes adapting the driver assistance system function on the basis of an estimated probability, for example an availability is defined.

The driver assistance system function is preferably adapted, for example is defined as available, if the estimated probability falls below or exceeds a threshold value, for example a defined threshold value. Adaptation may entail, in particular, that the driver assistance system function is defined as available and/or is calibrated and/or is configured, for example is configured as more progressive or more sensitive, and/or is fully or partially deactivated.

The driver assistance system advantageously comprises at least one sensor. At least one feature of the environment of the motor vehicle can be detected by the at least one sensor of the driver assistance system. In one advantageous design of the disclosure, an ultrasound sensor, for example parking sensors, and/or a radar sensor and/or a camera and/or a lidar sensor and/or a sonar sensor and/or a for a device that acquires electronic horizon information can be used to detect features of the environment of the vehicle.

In other words, the present disclosure comprises an algorithm that estimates characteristics or features in the environment of the vehicle, wherein data that are acquired by sensors already present in the vehicle, in particular a camera and radar, are advantageously used. An evaluation or estimation of sensor data can be used to estimate features of the vehicle environment, and/or decide on a setting of the driver assistance system functions, or to set said functions.

The disclosure offers a further advantage that different features are used and an appropriate combination of features is carried out in order to estimate a probability of the occurrence of at least one criterion, for example an exclusion criterion. A more reliable and realistic estimate than would be possible, taking account of individual features or criteria only, is thereby enabled. As a result, the driver assistance system function, in particular, availability and characteristics, can therefore be adapted more reliably to a respective vehicle environment than is possible on the basis of the prior art discussed above.

With the method according to the disclosure, the at least one criterion relating to the vehicle environment may comprise an occurrence of oncoming traffic and/or a permissibility of pedestrian traffic on the roadway and/or presence of pedestrians on the roadway and/or a permissibility of two-wheeled traffic on the roadway and/or presence of two-wheeled vehicles on the roadway. The aforementioned criteria are given by way of example and further criteria are therefore similarly possible.

In the case of the criterion relating to the occurrence of oncoming traffic, a probability of oncoming traffic in an adjacent lane that is not separated from a lane of the vehicle concerned is taken into account. In the case of the criterion relating to a permissibility of pedestrian traffic, a probability of pedestrians participating in traffic, i.e., for example, pedestrians sharing the roadway or also using an area around a road or roadway, is taken into account. This may be the case, for example, in the form of a sidewalk or crosswalk. In the case of the criterion relating to a presence of pedestrians on the roadway, a probability of pedestrians appearing on the road or roadway used by the vehicle is taken into account. In the case of the criterion relating to the permissibility of two-wheeled traffic, a probability of two-wheeled vehicles sharing the road or roadway used by the vehicle with said vehicle is taken into account. In the case of the criterion relating to the presence of two-wheeled vehicles on the roadway, a probability of two-wheeled vehicles appearing on the roadway on which the vehicle is driving is taken into account.

According to the disclosure, a number of features of the environment of the vehicle may comprise the following features: a speed of the vehicle exceeding a threshold value, and/or a target speed of the vehicle exceeding a threshold value, and/or presence of at least one detected pedestrian, and/or presence of at least one detected bicycle, and/or presence of at least one detected motorcycle, and/or presence of at least one detected moped, and/or presence of at least one detected motor scooter, and/or presence of detected oncoming traffic, and/or presence of a lateral distance from oncoming traffic exceeding a threshold value, and/or presence of a structural division between roadways, and/or presence of a road curb or road edge or a road demarcation, and/or presence of an occupied adjacent lane, and/or presence of a double traffic lane demarcation, and/or presence of a highway road sign, and/or presence of a speed limit sign.

The aforementioned features can, in principle, be selected and/or combined with one another depending on the driver assistance system function concerned, which is to be adapted for a respective vehicle environment, for example is intended to be permitted or excluded or changed.

The at least one driver assistance system function may, for example, be a traffic jam assistant, and/or a highway assistant, and/or an ACC stop-and-go, and/or an active high beam, or the method according to the disclosure may comprise one of said functions.

In a further variant, the driver assistance system function may allow hands-off driving. In the method, it may be defined, for example, when or in which driving situations hands-off driving function is available, or is not available. A warning signal, for example, may be indicated to the driver, informing the driver of an end of a availability of the function, for example the hands-off driving function. Depending on an estimated probability of a presence of at least one selected exclusion criterion, a time between an indication of individual warning signals, for example, can be lengthened or shortened.

In a further variant, an adaptation, for example for a decision relating to an availability or configuration of a traffic jam assistant, and/or a highway assistant, and/or associated functions, a probability of an occurrence of oncoming traffic, and/or an occurrence of pedestrians can be defined as a criterion, in particular as an evaluation criterion. The features, for example, relating to a presence of at least one detected pedestrian, no presence of detected oncoming traffic, presence of a lateral distance from the vehicle to oncoming traffic exceeding a threshold value and presence of a structural division between roadways, and/or presence of a road curb or a road edge or a road demarcation and presence of an occupied adjacent traffic lane can be combined with one another in order to determine a probability of an occurrence of one of the aforementioned criteria, or a combination of said criteria. This is an example of a selection of features that determine a probability of the occurrence of oncoming traffic and/or the occurrence of pedestrians. A different selection and combination of features is similarly possible.

In a further advantageous variant, a probability of the occurrence of two-wheeled vehicles and/or the occurrence of pedestrians in front of the motor vehicle is taken into account in the method according to the disclosure for an adaptation of an ACC stop-and-go function. The features relating to a presence of at least one detected pedestrian and a presence of at least one detected bicycle, and/or presence of at least one detected motorcycle and/or mopeds and/or motor scooter and/or scooter and the presence of at least one detected highway sign can be combined with one another for this purpose. A different selection and combination is again possible.

In a further advantageous variant, features can be combined for an adaptation of an active high beam function in order to distinguish between environments of the motor vehicle, which are located inside or outside a built-up area. The criteria and the features of the vehicle environment to be taken into account in this context are essentially selected with a view to a function that is intended to be made available or excluded.

The disclosure has an advantage that a multiplicity of features and criteria, in particular exclusion criteria, can in each case be flexibly selected and taken into account. In this way, a multiplicity of situations in the vehicle environment can be incorporated into respective adaptation, in particular a decision relating to availability or configuration of a driver assistance system function.

The device according to the disclosure for the adaptation of at least one driver assistance function of a motor vehicle on the basis of characteristics of the environment of the motor vehicle is designed to carry out the previously described method according to the disclosure. The device according to the disclosure may comprise, for example, at least one sensor that detects features of the environment of the vehicle, a estimating device that estimates a probability of a presence of at least one criterion for an adaptation of the driver assistance system function on the basis of a combination of detected features, and an adapting device that adapts the driver assistance system function on the basis of an estimated probability.

The motor vehicle according to the disclosure comprises at least one driver assistance system function and a previously described device according to the disclosure. The device according to the disclosure and the motor vehicle according to the disclosure have essentially the same characteristics, features and advantages as the previously described method according to the disclosure. The motor vehicle may, in principle, be a passenger vehicle, a truck, a motorcycle, a moped or any other vehicle.

Examples are described below that indicate conclusions that can be drawn in relation to a probability of specific criteria from concrete features of the environment of the vehicle. A high vehicle speed, for example, or a vehicle speed exceeding a threshold value or a target speed of the vehicle exceeding a threshold value can be detected, for example using data present in the vehicle. This feature can indicate that the vehicle is not located within a residential area or built-up area, but instead is located outside a town or on a highway. If the vehicle is not located in a built-up area or residential area, it can be concluded from this that a probability of pedestrians or slow, two-wheeled vehicles in traffic is low, in particular falls below a threshold value.

In a further variant, pedestrians can be detected. A detected pedestrian may indicate that the vehicle is located in a residential area or built-up area. A position of the pedestrian indicates a probability of a pedestrian participating in traffic or being located on the road. It can be concluded from this that a probability of a participation of pedestrians and/or two-wheeled vehicle drivers in traffic is high, in particular exceeds a threshold value.

In a further variant, a bicycle has been detected. A detected bicycle may indicate that the vehicle is located in a residential area or within a built-up area. It can be concluded from this that a probability of a participation of two-wheeled vehicles in the traffic is high. If a bicycle has been detected, a probability that two-wheeled vehicles are located on the roadway similarly increases.

A detected motor scooter, or motorcycle, indicates that it is probable that vehicles that are possibly not tied to specific lanes, but possibly change lanes also. If motorcycles or motor scooters have been detected, a probability that two-wheeled vehicles are participating in traffic or are located on a lane increases.

In a further variant, no oncoming traffic has been detected. No detected oncoming traffic in an adjacent lane indicates that either the adjacent lane is not an oncoming traffic lane, or oncoming traffic occurs only irregularly on the adjacent lane. It can be concluded from this that a probability of oncoming traffic in the adjacent lane is low or falls below a threshold value. This applies, in particular, if no oncoming traffic has been detected for a specific time, or a specific route travelled. Detection can be carried out, for example, using radar sensors or a camera.

If oncoming traffic has been detected at a long lateral distance from the vehicle, or at a lateral distance from the vehicle exceeding a threshold value, without corresponding detections having taken place at a shorter lateral distance, then either the adjacent lane is not provided for oncoming traffic or oncoming traffic occurs only rarely in the adjacent lane. It can be concluded from this that a probability of oncoming traffic in the adjacent lane is low, particularly if oncoming traffic has been detected at a constantly long lateral distance.

In a further variant, a structural separation, or a road edge, has been detected. A detection of a structural separation, or division between a lane used by the vehicle and the adjacent lane in a direction of oncoming traffic, indicates that the vehicle cannot drive into oncoming traffic. It can be concluded from this that a probability of steering into oncoming traffic is low, or falls below a threshold value particularly if a structural division between the vehicle and the adjacent lane has been detected.

In a further variant, the adjacent lane is occupied. A detection of traffic in the adjacent lane travelling in a same direction as the vehicle indicates that there is no oncoming traffic in the adjacent lane. It can be concluded from this that a probability of oncoming traffic in the adjacent lane is low, or falls below a threshold value particularly if traffic travelling in the same direction as the vehicle has been detected in the adjacent lane.

In a further variant, a double-lane marking has been detected. A double-lane marking in relation to the adjacent lane indicates that the adjacent lane is provided for oncoming traffic. It can be concluded from this that a probability of oncoming traffic in the adjacent lane is high, or exceeds a threshold value particularly if a double-lane marking in relation to the adjacent lane has been detected.

In a further variant, a highway sign has been detected. A highway sign indicates that there is no oncoming traffic in the adjacent lane, and no pedestrians in traffic. It can be concluded from this that a probability of oncoming traffic in the adjacent lane is low or falls below a threshold value. It can furthermore be concluded that a probability of pedestrians and bicycles in traffic is low or falls below a threshold value.

In a further variant, a speed limit sign has been detected. Depending on an indicated speed limit, a speed limit sign may indicate that the vehicle is not located in a built-up area. It can be concluded from this that a probability of pedestrians and slow, two-wheeled, vehicle drivers or two-wheeled vehicles, such as, for example, motor scooters or mopeds, in traffic is lower or falls below a threshold value particularly if the vehicle is not located in a built-up area.

A highway sign or a speed limit sign can be detected, for example, using a camera.

The aforementioned variants can be combined with one another in a variety of ways. A specific number of features should be combined with one another in order to obtain reliable results from sensor data. A combination of features can be carried out in different ways. It can essentially be carried out so that it is adapted to requirements of a respective function that is to be adapted, for example a function that is to be calibrated or permitted or excluded, and adapted to existing sensors or a desired reliability. If, for example, only a radar sensor is available, a detection of oncoming objects can be combined with a detection of crash barriers in order to achieve an estimation of a probability of oncoming traffic in the adjacent lane. In a different example, if a reliable estimation of permitted oncoming traffic is to be carried out, a combination of interrelated signals of a detection of a structural division of lanes, of an oncoming traffic detection and a detection of an adjacent occupied lane can be carried out in order to achieve a reliable estimation of a probability that oncoming traffic is permitted in the adjacent lane.

Further features, characteristics and advantages of the present disclosure will be described in detail below on the basis of example embodiments with reference to the attached Figures. All features described above and below are advantageous, not only individually, but also in any combination with one another. The example embodiments described below merely represent examples that do not, however, limit the subject-matter of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
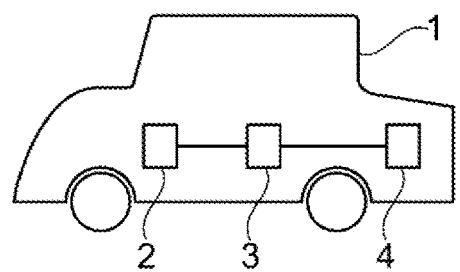
FIG. 1 shows, schematically, a motor vehicle according to the disclosure.

FIG. 1 shows, schematically, a motor vehicle according to the disclosure with a device according to the disclosure. The motor vehicle 1 according to the disclosure comprises a driver assistance system 2 or an application device to apply at least one driver assistance system function. The motor vehicle 1 furthermore comprises at least one sensor 4 to detect features of an environment of the motor vehicle 1. The motor vehicle 1 furthermore comprises a estimation device 3 to estimate a probability of a presence of at least one exclusion criterion on a basis of a combination of detected features, and an estimation device 3 that defines an availability of the driver assistance system function based on an estimated probability. In the present design variant, an estimation of a probability of the presence of at least one criterion, for example an exclusion criterion, and adaptation, for example definition of an availability, of the driver assistance system function on the basis of the estimated probability is implemented with the estimation device 3. A possibility also exists, on the one hand, of providing a device that estimates the probability and a further device that adapts, for example that defines an availability, of the driver assistance system function.

The at least one sensor 4 may, for example, be a radar sensor, and/or an ultrasound sensor, and/or a camera, and/or a lidar sensor, and/or a sonar sensor, and/or a device that acquires electronic horizon information.

The driver assistance system 2 may comprise, for example, a traffic jam assistance function, and/or a highway assistance function, and/or an ACC stop-and-go, and/or an active high beam assistant. The device according to the disclosure and the vehicle 1 according to the disclosure is designed to carry out a method described below.

Figure 2:
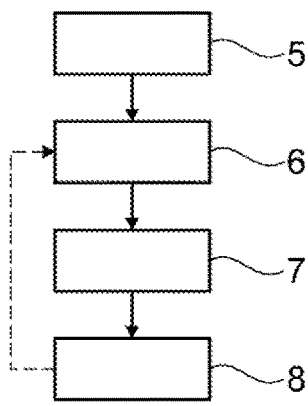
FIG. 2 shows, schematically, a variant of the method according to the disclosure via a flow diagram.

FIG. 2 shows, schematically, a variant of the method according to the disclosure in the form of a flow diagram. In the method to operate a motor vehicle using a driver assistance system 2, at least one adaptation criterion relating to the vehicle environment, for example an exclusion criterion for an availability of the driver assistance system function, is defined in a step 5 for at least one driver assistance system function.

A number of features of the environment of the vehicle 1 are detected in step 6. A plurality of features is preferably detected using sensors 4. Sensors 4, for example, that are already present in the motor vehicle 1 can be used.

A probability of an occurrence of at least one criterion is estimated in step 7 on the basis of a combination of detected features.

In step 8, the driver assistance system function is adapted on the basis of an estimated probability. An availability of the driver assistance system function, for example, can be defined on the basis of the estimated probability. A driver assistance system function is preferably adapted if the estimated probability falls below or exceeds a threshold value for a presence of at least one criterion. In particular, a driver assistance system function can be defined as unavailable if the estimated probability exceeds a threshold value for the presence of at least one exclusion criterion.

The method may end in step 8 following adaptation of the driver assistance system function. Alternatively, the method may be continued with step 6, i.e. the method can be carried out, in particular, in an adjustment method. This is indicated by a broken-line arrow in FIG. 2.

A design variant of the method according to the disclosure is described below in which a presence of pedestrians or two-wheeled vehicles, in particular cyclists, on the roadway is defined as an exclusion criterion. The driver assistance system function concerned may, for example, be a function in which hands-off driving is enabled. In this variant, the following boundary conditions can be taken into account: Information relating to a road type is available, for example in the form of electronic horizon information, and pedestrians are detected via a camera. Further information relating to the roadway is available via radar and/or a camera, for example information relating to a presence of objects on the roadway, obstacles or available lanes.

It is queried whether information obtained from the electronic horizon indicating that the road type is, for example, a multi-lane road, sufficiently reduces a potential risk of driving with no hands on a steering wheel, also referred to below as hands-off driving. If so, does detection by a camera and/or a radar sensor of the presence of an obstacle or an adjacent lane in a same direction sufficiently reduce the risk? If not, and if pedestrians are present, an algorithm should be implemented that reduces a time for hands-off driving. If a pedestrian has been detected in a travel path of the vehicle, this may entail that no extended hands-off driving time is available for a next 200 meters.

In a first step, if no pedestrian is present in a vicinity of a lane that is being used, extended hands-off driving may be available. However, an extended hands-off driving time, for example 120 seconds, may be a time that is more than sensors can predict. A presence or absence of pedestrians must therefore be inferred from information resulting from preceding measurements. In pedestrian-related traffic situations, the past relates more to distances travelled by the vehicle 1 than to driven time intervals. Since assumptions relating to pedestrians are relevant primarily in cities or built-up areas, a decisive distance should relate to urban structures, such as buildings and other structures. For example, a length of a long building block, for example 200 m, could be used as a measure.

In a second step, extended hands-off driving may be available if no pedestrian was present in the vicinity of the lane used by the vehicle 1 in the last 200 m of a travelled route. However, the previously described algorithm is not the only indication that allows an extended hands-off driving time. The indication involves an input signal that indicates that hands-off driving is reduced in areas used by pedestrians. An interface of the algorithm is therefore "pedestrians present," and a condition must be reformulated.

In a third step, the driver assistance system 2 establishes whether the vehicle 1 is located in an area used by pedestrians. This is the case if a pedestrian was present in the vicinity of the lane within the last 200 m of the travelled route. The term "in the vicinity of the lane" can be individually specified. The driver should essentially learn not to drive hands-off in areas where pedestrians and vehicles are, or are potentially on the roadway or a sidewalk.

In a fourth step, the driver assistance system 2 establishes whether pedestrians are present. This is the case, for example, if a pedestrian has been observed for the last 200 m of the travelled route at a distance of less than 15 m laterally, or in a transverse direction, and at a distance of less than 60 m in a direction of travel, or in a longitudinal direction in front of the vehicle 1. The indicated distances are merely examples and may also be defined differently.

A design variant is described below that relates to a feature wherein an adjacent lane is occupied. The following definition applies to a corresponding algorithm: There is no oncoming traffic in the adjacent lane if said lane is occupied by vehicles that are stationary or travelling in the same direction as the vehicle concerned, i.e. the vehicle 1 that uses the method according to the disclosure. An adjacent lane is a lane next to the lane used by the vehicle concerned, for example to a left of a used lane for right-hand traffic, or a right for left-hand traffic. Occupied means that the lane is occupied if oncoming traffic cannot fit into a gap between two vehicles, or a detected vehicle and the vehicle concerned. The same direction means that an angle between a speed vector of the vehicle concerned and a speed vector of a target vehicle is less than 20 degrees, i.e. is preferably 0°±10°.

In relation to the "occupied" feature, a basic assumption is made that there is no oncoming traffic as long as an observed vehicle is travelling in the same direction as the vehicle concerned, or a stationary target is observed in the adjacent lane. However, this assumption is unsuitable for motor cycles or motor scooters, which are normally narrower than the vehicle 1 and can change highly, dynamically between different lanes.

Figure 3:
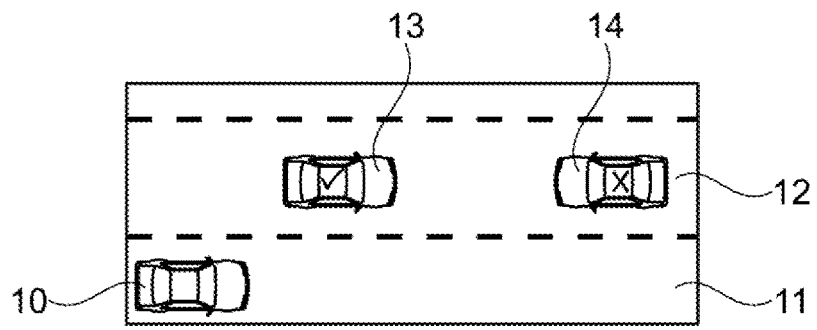
FIG. 3 shows, schematically, a top view of a roadway.

FIG. 3 illustrates a top view of a travelled road. The vehicle concerned 10 uses a lane 11. An adjacent lane 12 is considered as occupied, and therefore without oncoming traffic if only a vehicle travelling in a same direction as the vehicle concerned 10 is present. This is the case in FIG. 3 for a vehicle 13. An oncoming vehicle 14 in FIG. 3, must not have been observed.

In terms of geometry, an area to be considered, which is checked for objects in adjacent lanes 12, is defined as follows: A minimum width (min), i.e. a relevant distance in a lateral direction, can be defined as a sum of half a vehicle width plus a distance from the vehicle concerned 10 to a lane marking plus a distance from an observed object to the lane marking, for example min=1 m+0.5 m+0.5 m., a maximum width (max) can be defined as the sum of half the vehicle width plus the distance from the vehicle 10 to the lane marking plus the distance from the observed object to the lane marking plus a minimum lane width, for example max=1 m+0.5 m+3.05 m=4.55 m.

In terms of the length, i.e. a relevant distance in the longitudinal direction, and a distance for a reliable detection can be defined. Since the vehicle concerned 10 and the observed vehicle 14 or other observed objects are not necessarily travelling straight ahead, a lateral distance, dy, is preferably compared with an intersection with a trajectory 46 of the vehicle concerned 10. There is normally no requirement to carry out detection for more than a specific distance in front of the vehicle 10, since, for example in the case of traffic jams, a view is blocked by vehicles travelling ahead. A length should be configured in relation to false-positive detections on bends.

Figure 4:
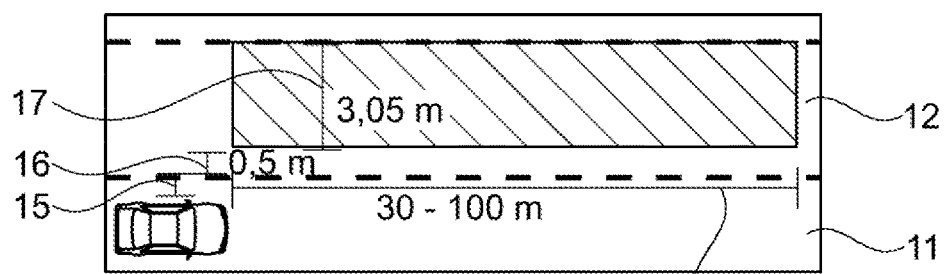
FIGS. 4-13 each show, schematically, a top view of a roadway.
Figure 5:
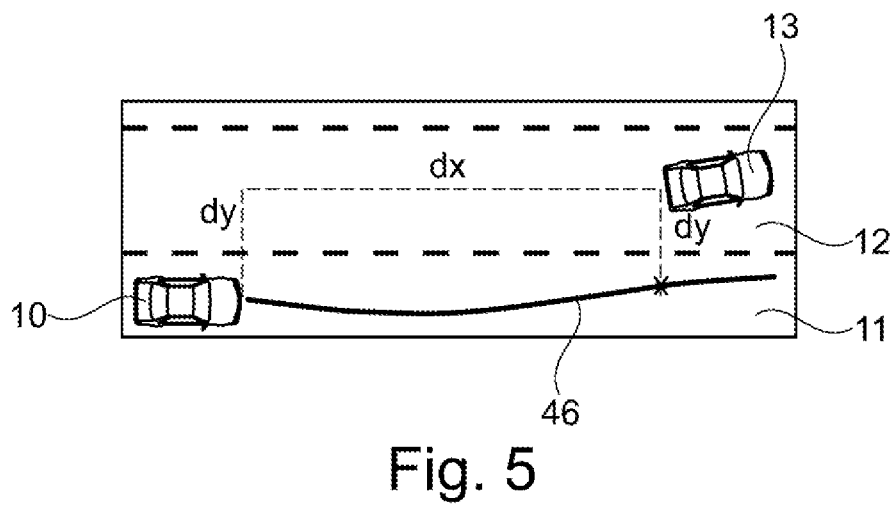

Geometric definitions are illustrated in FIGS. 4 and 5. The reference number 15 indicates a distance from the vehicle concerned 10 to the lane marking. The reference number 16 indicates the distance from the observed vehicle to the lane marking. The reference number 17 indicates the minimum lane width. The reference number 18 indicates the distance in the direction of travel or in the longitudinal direction for a reliable detection.

An adjacent lane 12 can be regarded as occupied if there is an object for which an angle in relation to the lane 11 is less than e.g. 10 degrees and the longitudinal distance is less than 100 m and the lateral distance is between 1.5 m and 4.55 m from the trajectory 46.

Figure 6:
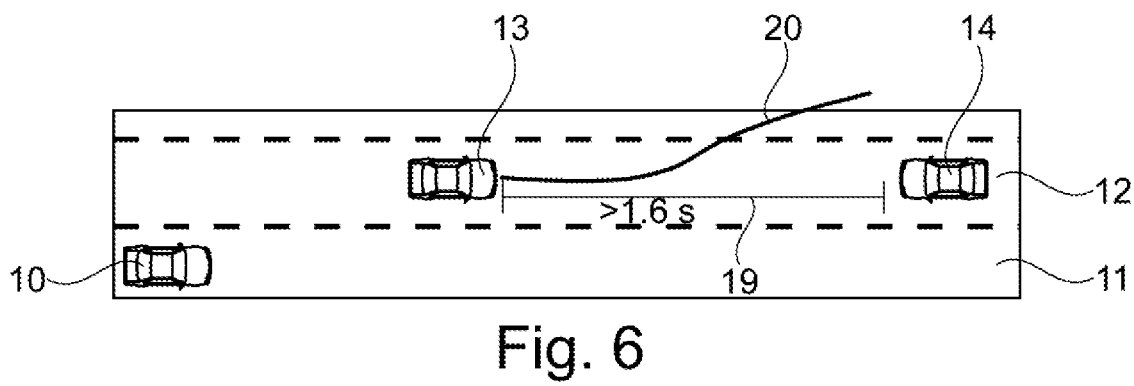
Figure 7:
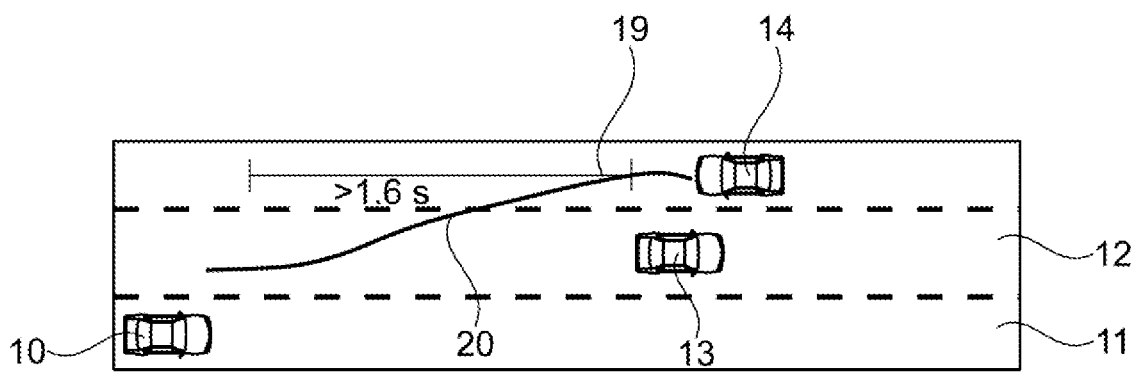

After the relevant observed target has disappeared, the occupied lane is preferably additionally observed or assessed for 1.6 seconds and 30 m. It is known that a vehicle maneuver that takes place within a time period of less than 1.6 seconds can be regarded as sporty. Assuming that there is little probability of sporty or dangerous evasive maneuvers by the oncoming vehicle 14, it can be assumed that no oncoming vehicle 14 will occur for at least 1.6 seconds after a last relevant object occupying the lane 11 has been detected. Both cases resulting therefrom are illustrated in FIGS. 6 and 7. The reference number 19 indicates a route that can be covered within more than 1.6 seconds. Possible evasive maneuvers are indicated by the reference numbers 20. In the case shown in FIG. 6, an observed vehicle 13, which is travelling in the same direction as the vehicle concerned 10, changes lanes. In the variant shown in FIG. 7, an oncoming vehicle 14 changes lanes.

A concept for an algorithm that relates to a feature wherein no oncoming vehicle 14 is present in the adjacent lane 12 is described below. It is based on the notion that an extended hands-off driving should be reduced if the oncoming vehicle 14 is permitted in the adjacent lane 12. The following assumptions can be made here: If no oncoming vehicle 14 was present in the adjacent lane 12 for a specific time period or a specific distance or travelled route, it is less probable that a regular oncoming vehicle 14 occurs, at least until the next oncoming vehicle 14 has been detected. This assumption can be made, since no oncoming vehicle 14 in the adjacent lane 12 implies that an oncoming vehicle 14 is not allowed in the adjacent lane 12, for example a highway or is the like is involved, or that there is only an irregular oncoming vehicle 14, for example when driving at night on a country road.

The following definitions can be made for an algorithm: An oncoming vehicle 14 is detected if a motorized vehicle 14 has been detected at a lateral distance less than a checkable distance, and is travelling in an opposite direction to the vehicle concerned 10. A motorized vehicle is a motor vehicle, for example a passenger vehicle, motorcycle or truck. The checkable lateral distance is a distance between the vehicle concerned 10 and an observed vehicle, which is less than twice a standard lane width. Travelling means that the vehicle is moving along at a speed of more than 10 km/h. Opposite direction means that an angle between the speed vector of the vehicle concerned 10 and a speed factor of the observed vehicle in a plane (2d) is 180°±10°.

Figure 8:
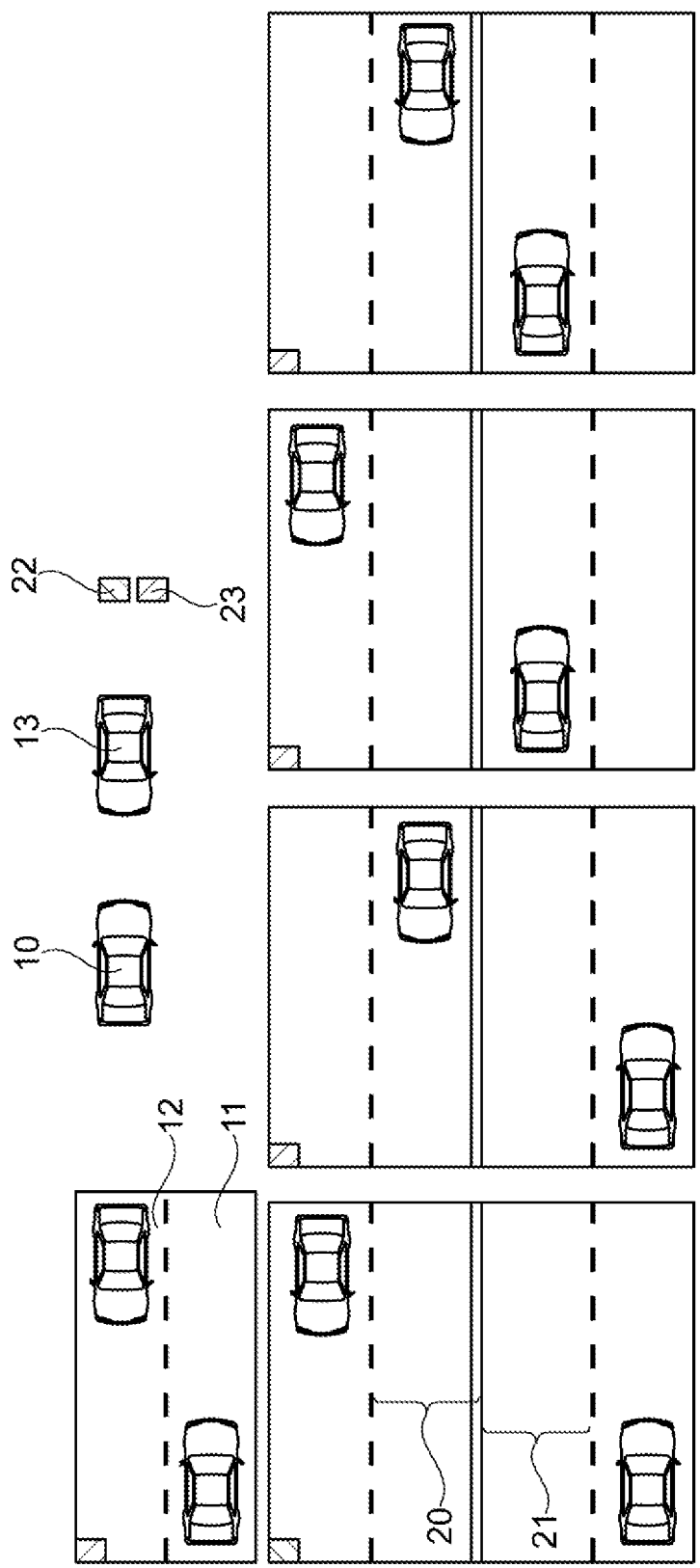

It can be concluded that the oncoming vehicle 14 is observed if an oncoming vehicle 14 has been detected at a lateral distance of less than two lane widths from the vehicle concerned 10. This is shown in different variants in FIG. 8. It is assumed here that a lane width is considered as an overtaking space for the oncoming vehicle 14. This is indicated with the reference number 20. An additional lane is regarded as a checkable space between the vehicle concerned 10 and the potentially overtaking vehicle. This is indicated with the reference number 21. The situations marked in FIG. 8 with a circle 22 indicate that no adjacent oncoming traffic has been detected. The driving situations indicated with squares 23 indicate that adjacent oncoming traffic has been detected.

Figure 9:
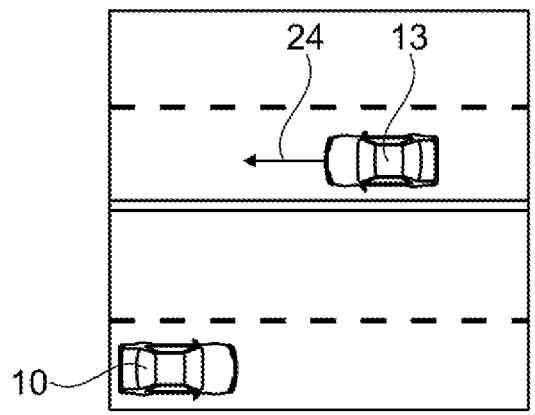

An algorithm may be based, for example, on a model as shown schematically in FIG. 9. A direction of travel of the oncoming vehicle 14 is indicated with an arrow 24. In the case shown, an oncoming vehicle 14 or object is detected in an area with a longitudinal distance between 0 m and 20 m (0 m<dx<20 m) and a lateral distance of less than 6 m (|dy|<6 m). This offers the advantages that a model of this type can be simply implemented and supplies reliable results for correspondingly small areas. A disadvantage, however, is a tendency for very late detection.

Figure 10:
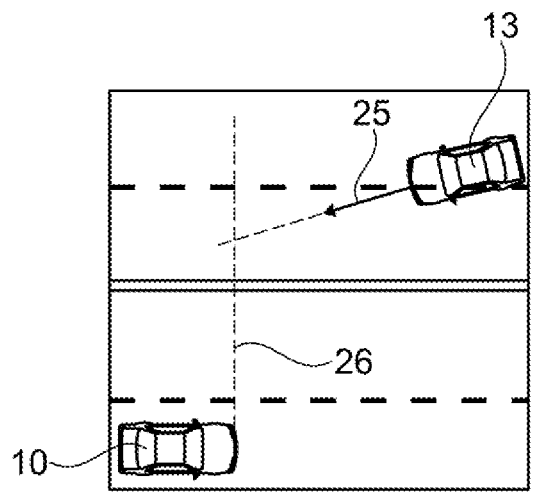

An alternative or additional variant is shown in FIG. 10. In this case, an intersection is defined between an extended frontal line 26 of the vehicle concerned 10 in the lateral direction and a frontal direction vector 25 of an observed vehicle 13. This intersection should be located at a distance of less than 6 m from the vehicle concerned 10 in the lateral direction.

The variant shown in FIG. 10 offers the advantage that an early detection is possible and the result represents positions at which a risk also actually threatens to occur. Disadvantages, however, are possible, errors resulting from the fact that a path of the observed vehicle 13 can be defined only with a substantial error. If the observed vehicle 13 is moving on a bend, this results in a further range of dy values. In addition, a moderately complex implementation is involved.

Figure 11:
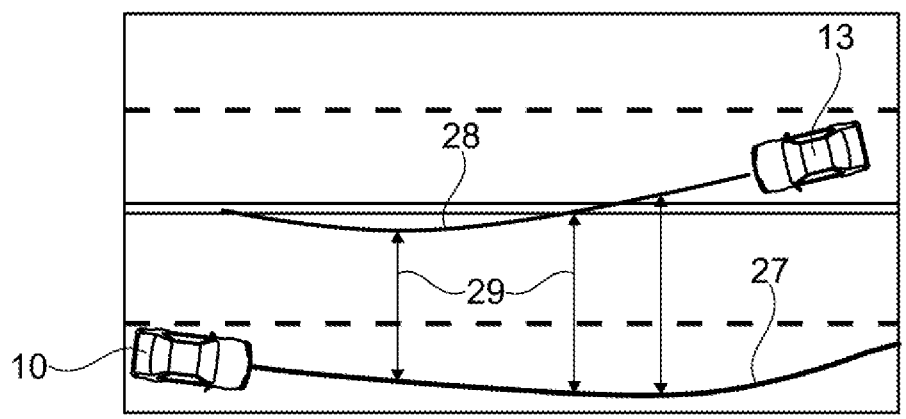

A further approach is shown schematically in FIG. 11. Here, a minimum lateral distance 29 between a trajectory 28 or a path of the observed vehicle 13 and a trajectory 27 of the vehicle concerned 10 is investigated. This distance 29 should be less than 6 m (min (SPP, target path)<6 m). This approach offers the advantage that an early detection is possible and fewer false detections occur compared with the variant shown in FIG. 10. A disadvantage, however, is that a highly complex approach is involved, particularly in terms of the definition of the path of the observed vehicle.

The aim is essentially to observe not only an individual occurrence of oncoming traffic, but to define an overall probability of an exclusion criterion for an availability of a driver assistance system function, for example the hands-off driving function. An early detection is difficult, given that, with greater distances, greater uncertainties occur in relation to a prediction of a path of the vehicle concerned 10 and the observed vehicle 13. An early detection of the oncoming vehicle 14 cannot be guaranteed, since a view may possibly be blocked by the observed vehicle 13 travelling ahead of the vehicle concerned 10. Consequently, an early definition is suitable only for objects that are not far away from the vehicle concerned 10. Following a positive detection, the oncoming vehicle 14 can be observed, for example, for 400 m or for 30 seconds. Other values can similarly be set. If no oncoming vehicle 14 has been observed in this time period or for this distance, an oncoming vehicle 14 is either not permitted or occurs only very irregularly, thus reducing a probability of a corresponding occurrence. Since the aforementioned values are set comparatively high, a signal can be reset accordingly if an oncoming vehicle 14 is detected.

Figure 12:
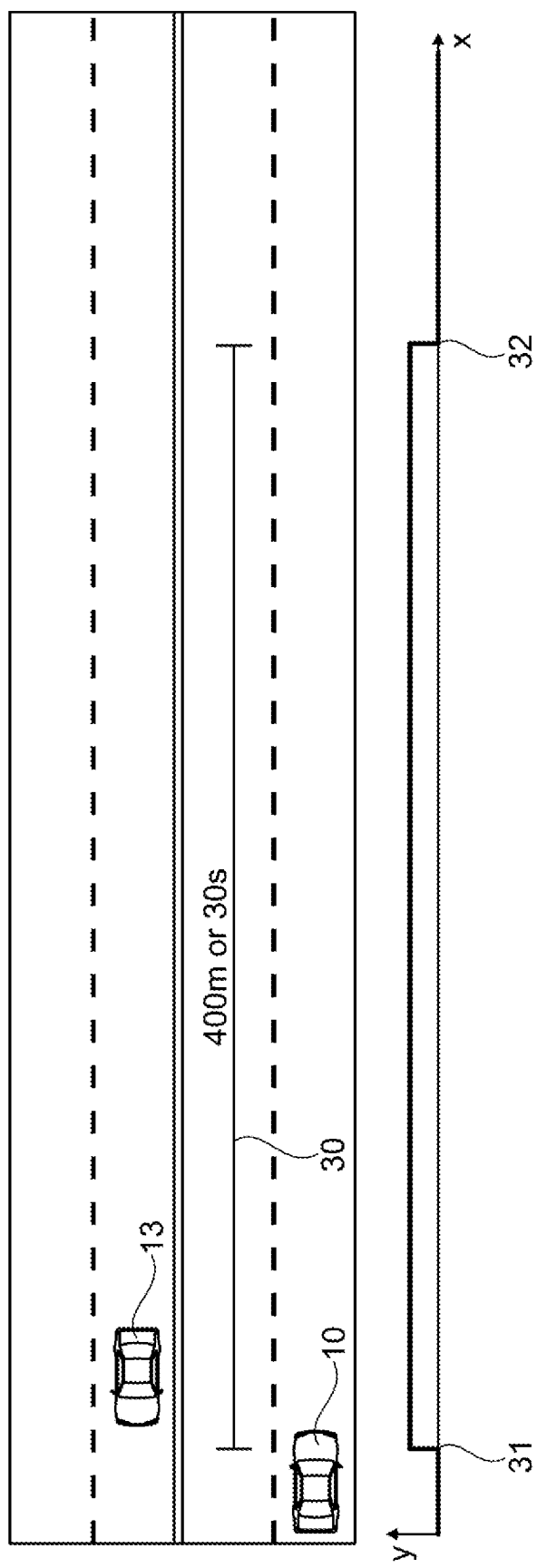

This is shown, schematically, for example, in FIG. 12. A distance 30 indicates either a distance of 400 m or a distance travelled within 30 seconds. In the diagram shown below, an oncoming vehicle 14 has been detected at point 31. For the distance 30, i.e. up to point 32, it is therefore assumed that oncoming traffic occurs. If no further detection occurs in this time period, i.e. during the travelling of the distance 30, the signal is reset.

A design variant is described below in connection with a traffic jam assistant. A distinction can initially be made between three situations, i.e. 1. a situation in which the adjacent lane 12 is separated from the lane 11 concerned, 2. s situation in which no oncoming vehicle 14 occurs in the adjacent lane 12, or 3. a situation in which the adjacent lane 12 is occupied. If one of these situations occurs, a traffic jam assistant, for example, can be used or parameters can be adapted, in particular hands-off driving can be permitted. The aforementioned three driving situations can be characterized with three independent algorithms. Each of the aforementioned road situations excludes the occurrence of the oncoming vehicle 14. A consideration of only these three driving situations represents a fast and favorable solution. This is furthermore characterized by a high reliability, since there are three possibilities for excluding the function. This approach is robust, wherein, for example, via filters or statistics, a minimum separation of 30 m in length can be observed in each case, vehicles driving on a same lane in a same direction can be observed either often or for a long period and a close oncoming vehicle 14 is not concealed by the separation between the lanes, i.e. is clearly visible. In the last-mentioned case, a detection probability therefore increases two to three times, and therefore almost reaches 100%.

A design variant is explained in detail below that takes account of a feature wherein a structural division between roadways is present or is detected. A decision regarding a permissibility of an extended hands-off driving time requires detection of an environment or a traffic situation that excludes or indicates a high improbability of difficult traffic situations, for example oncoming traffic or pedestrians. An occurrence of oncoming traffic of an adjacent lane can be excluded if a structural division is present between the lanes concerned and no oncoming traffic can fit between the vehicle concerned and the structural division. Corresponding structures may be detected, for example, using a radar-camera sensor system. Visible road edges or road demarcations or crash barriers, for example, can be detected with a camera or using radar.

A model is defined below to decide whether oncoming traffic is or is not possible in the adjacent lane. A distinction can be made here between the following situations: 1. bilateral lane markings and an obstacle, 2. left-hand lane marking and obstacle, 3. right-hand lane marking and obstacle, 4. no lane marking and obstacle, 5. no obstacle, 6. no lane markings and no obstacle.

It can furthermore be defined that an adjacent lane 12 is separated if a structural division is present between the adjacent lane 12 and the lane 11 used by the vehicle concerned 10. An obstacle must have a specific length in order to be regarded as a structural division. Pedestrian islands, for example, or the like do not represent a structural division. A pedestrian island is typically around 10 m in length. There is no defined length for a structural division, so a minimum length is defined, for example, using a length of pedestrian islands. Three times the length of a pedestrian island, i.e. 3×10 m=30 m, can preferably be assumed as a minimum length of a structural division.

Small gaps, for example passageways or crossings in structural divisions, do not mean that the adjacent lane 12 is no longer structurally divided. Assumptions are made below in order to define bridging passageways of this type. A turning lane (U-turn) does not define an end of a structural division. An intersection does not end a structural division, particularly if a division of lanes is maintained beyond the intersection. In order to detect a plurality of relevant intersections, five lanes in each direction are assumed. A minimum lane width is assumed to be 3.05 m. This corresponds to a standard lane width. If the separation or division is not also disposed at an edge of the roadway, 5 m per division can be added. A width of divisions on which pedestrians may be present is at least 2 m. an intersection length is therefore, for example, 10×3.05 m+2×5 m+2 m, i.e. 42.5 m in total.

An algorithm filter for divided lanes is explained in detail below with reference to FIG. 13. An x-axis indicates a road, a y-axis indicates, at zero, that adjacent lanes are not separated, and at one that the adjacent lanes are separated, i.e. are structurally divided from one another. It is assumed here that adjacent lanes are structurally divided from one another if a length of the structural division, for example in a direction of travel, is greater than a minimum length for a structural division. The minimum length of a structural division can be defined, for example, as a value of 30 m. An adjacent lane 12 is furthermore regarded as not structurally divided if a length of the lane that has no structural division is greater than a minimum length for a structural division that is not present. A minimum length for a non-structural division can be individually defined. It is advantageously defined as a typical intersection length, for example as a value of 42 m.

Figure 13:
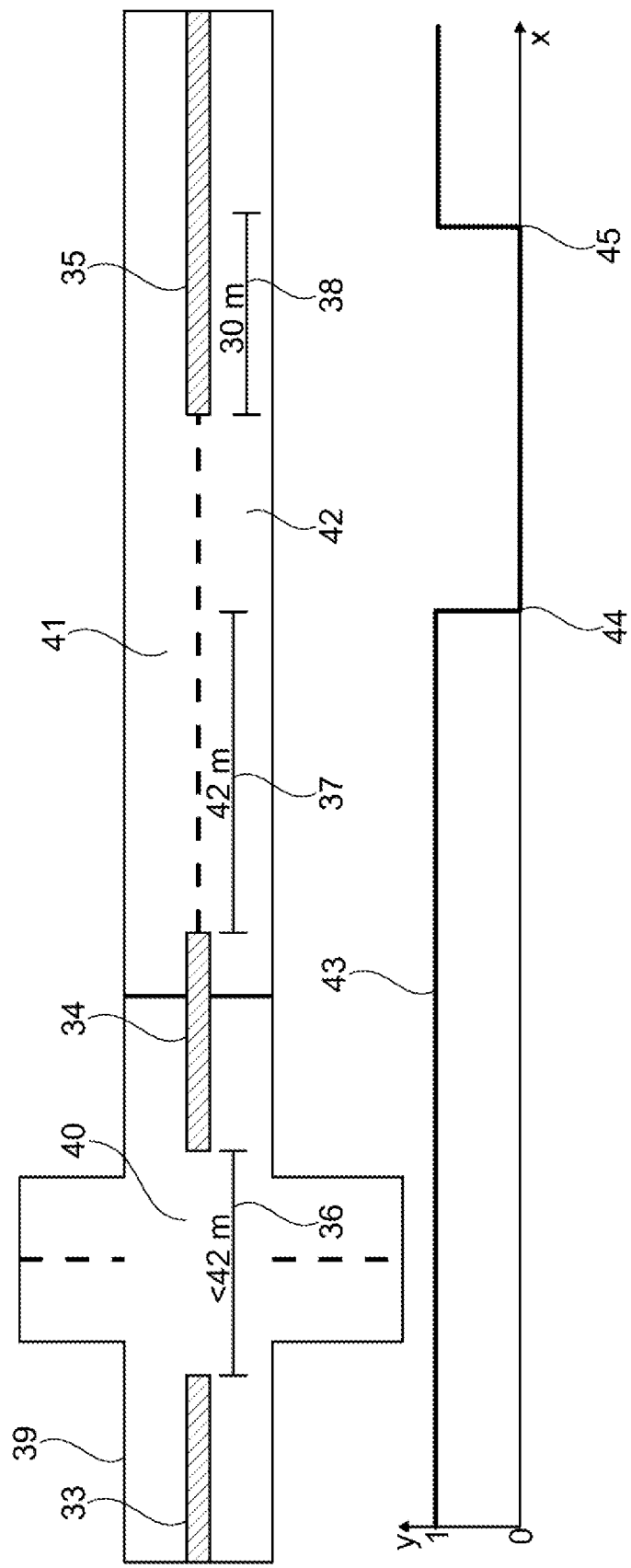

A road shown in FIG. 13 comprises a roadway running in the x-direction with two lanes 41 and 42, and an intersection 40. The lanes 41 and 42 are separated from one another on three stretches of the road by structural divisions 33, 34 and 35. A distance in the x-direction between a first structural division 33 and a second structural division 34 is indicated by reference number 36. The distance is less than 42 m. A gap in the x-direction is located between the second structural division 34 and a third structural division 35. This is more than 42 m in length. The length of 42 m is indicated by the reference number 37. The reference number 38 indicates a length of 30 m from a start of the third structural division 35 in the x-direction.

The diagram below in FIG. 13 indicates a result produced by the algorithm filter at the respective positions in the x-direction via a curve 43. Coming from the left, the lanes 41 and 42 are initially regarded as structurally divided. The distance between the first structural division 33 and the second structural division 34, which is indicated by the reference number 36, is too small to interrupt the structural division. At an end of the second structural division 34, a defined intersection length, which is indicated by the reference number 37, is first added. No structural division between the adjacent lanes 41 and 42 is therefore first assumed at an x-value indicated by the reference number 44. A minimum length, which has been defined for a structural division and is indicated by the reference number 38 and is currently 30 m, is first taken into account from a start of the third structural division 35. A structural division of the lanes is then assumed as from a point on the x-axis indicated by the reference number 45.

A tree diagram is explained in detail below with reference to FIG. 14 as an approach for an algorithm. Individual points of the tree diagram are illustrated in FIG. 15.

As a base or root of the tree diagram 50, a decision is to be made as to whether oncoming traffic is possible by the assistance system 2. Right-hand traffic is illustrated here. Left-hand traffic can be treated in a similar manner with the corresponding changes in relation to indications of sides. At a next level, the driver assistance system 2 investigates whether a road edge has been detected. At leaf 51, no road edge has been detected. At leaf 52, a road edge has been detected. If, as at leaf 51, no road edge has been detected, it is then investigated whether the adjacent lane is occupied or not. At leaf 54, the adjacent lane is occupied, at leaf 53 the adjacent lane is not occupied. If the adjacent lane is not occupied at leaf 53, oncoming traffic is possible. If the adjacent lane is occupied at leaf 54, oncoming traffic is not possible. A result that no oncoming traffic is possible is indicated by a tick in FIG. 14. A result that oncoming traffic is possible is indicated in FIG. 14 by a cross or X.

If a road edge has been detected at leaf 52, the driver assistance system 2 investigates whether and which lane markings are present. At leaf 55, no lane marking has been observed, at leaf 56 only a right-hand lane marking has been detected, at leaf 57 only a left-hand lane marking has been detected and, at leaf 58, both lane markings have been detected as present.

If no lane markings are present, the driver assistance system 2 investigates whether a distance to the road edge is greater or less than a vehicle width. At leaf 59, the distance to the road edge is less than the vehicle width, therefore no oncoming traffic is possible. At leaf 60, the distance to the road edge is greater than the vehicle width. If this is the case, the driver assistance system 2 investigates whether a second road edge has been detected. At leaf 60, this is the case. At leaf 62, no second road edge has been detected, therefore oncoming traffic is possible. If a second road edge has been detected at leaf 61, the driver assistance system 2 investigates whether a distance between road edges is greater or less than twice the minimum lane width. At leaf 63, the distance between the road edges is less than twice the lane width, therefore no oncoming traffic is possible. At leaf 64, the distance between the road edges is greater than twice the lane width, therefore oncoming traffic is possible.

Following leaf 56, the driver assistance system 2 investigates whether a distance between a detected right-hand lane marking and the road edge is greater or less than twice the minimum lane width. At leaf 66, the distance is less than twice the lane width, therefore no oncoming traffic is possible. At leaf 65, the distance is greater than twice the lane width. In this case, the driver assistance system 2 investigates whether the distance to the road edge is greater or less than the vehicle width. At leaf 67, the distance to the road edge is less than the vehicle width, therefore no oncoming traffic is possible. At leaf 68, the distance to the road edge is greater than the vehicle width. Oncoming traffic is therefore possible.

If only a left-hand lane marking has been detected at leaf 57, the driver assistance system 2 investigates whether a second road edge has been detected. At leaf 69, no second road edge has been detected. At leaf 70, a second road edge has been detected. Following leaf 69, the driver assistance system investigates whether the distance from the left-hand lane marking to the road edge is greater or less than the lane width. At leaf 71, the distance between the left-hand lane marking and the road edge is less than the lane width. At leaf 72, the distance from the left-hand lane marking to the road edge is greater than the lane width, therefore oncoming traffic is possible.

Following leaf 71, the driver assistance system 2 investigates whether the distance to the road edge is greater or less than the vehicle width. At leaf 74, the distance to the road edge is less than the vehicle width, therefore no oncoming traffic is possible. At leaf 73, the distance to the road edge is greater than the vehicle width. The driver assistance system 2 investigates whether the distance to the road edge is greater or less than the lane width. At leaf 76, the distance to the road edge is greater than the lane width, therefore oncoming traffic is possible.

At leaf 75, the distance to the road edge is less than the lane width. In this case, the driver assistance system 2 investigates whether the vehicle concerned is driving close to or at a distance from the lane. This decision can be made via a threshold distance. At leaf 77, the vehicle is driving close to the lane marking, therefore no oncoming traffic is possible. At leaf 78, the vehicle is driving at a distance from the lane marking, therefore oncoming traffic is possible.

Following leaf 70, the driver assistance system 2 investigates whether the distance between the two road edges is greater or less than twice the minimum lane width. At leaf 79, the distance between the road edges is less than twice the minimum lane width, therefore no oncoming traffic is possible. At leaf 80, the distance between the road edges is greater than twice the minimum lane width. In this case, the decision method is continued at leaf 56.

Following leaf 58, i.e. the detection of both lane markings, the driver assistance system 2 investigates whether the lane width is correct. At leaf 81, the lane width is not correct. At leaf 82, the lane width is correct. Following leaf 82, the driver assistance system checks whether the distance from the left-hand lane marking to the right-hand road edge is greater than the lane width. At leaf 90, the distance between the left-hand lane marking and the road edge is less than the lane width, therefore no oncoming traffic is possible. At leaf 91, the distance from the left-hand lane marking to the road edge is greater than the lane width, therefore oncoming traffic is possible.

Following leaf 81, i.e. in the case of incorrect lane width, the driver assistance system 2 investigates whether the lane is too narrow or too wide. At leaf 83, the lane is too narrow, in which case the method is continued at leaf 57. At leaf 84, the lane is too wide. In this case, the driver assistance system 2 checks whether the vehicle is travelling close to one of the lane markings. At leaf 86, the vehicle is travelling close to the left-hand lane marking, in which case the method is continued at leaf 56. At leaf 87, the vehicle is located close to the left-hand lane marking. In this case, the method is continued at leaf 57.

At leaf 85, the vehicle is not located close to a lane marking. In this case, the driver assistance system 2 checks whether the distance to the road edge is greater or less than the vehicle width. At leaf 88, the distance is less than the vehicle width, in which case no oncoming traffic is possible. At leaf 89, the distance to the road edge is greater than the vehicle width, in which case oncoming traffic is possible.

Figure 14:
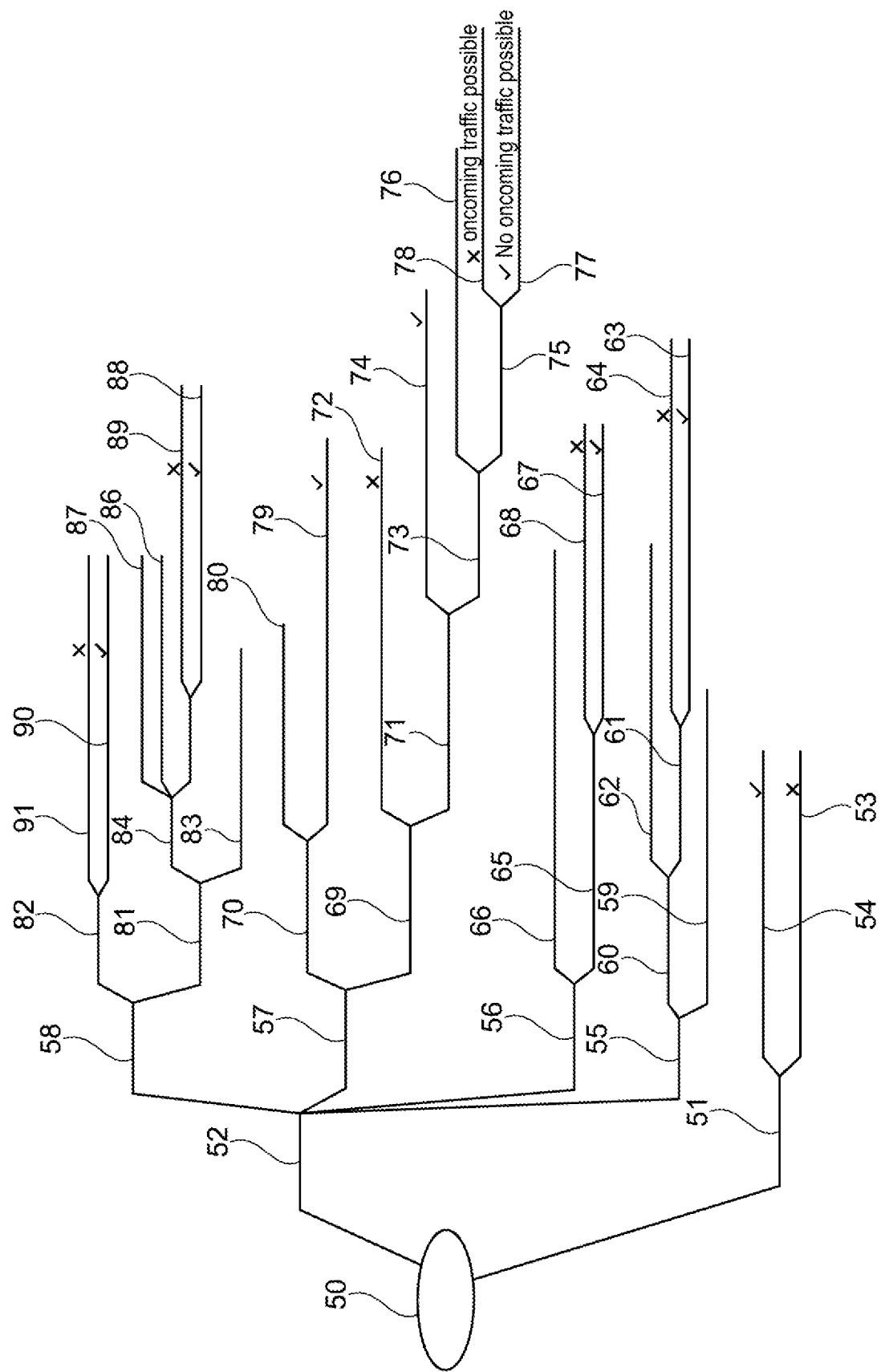
FIG. 14 shows, schematically, an algorithm via a decision tree diagram.
Figure 15:
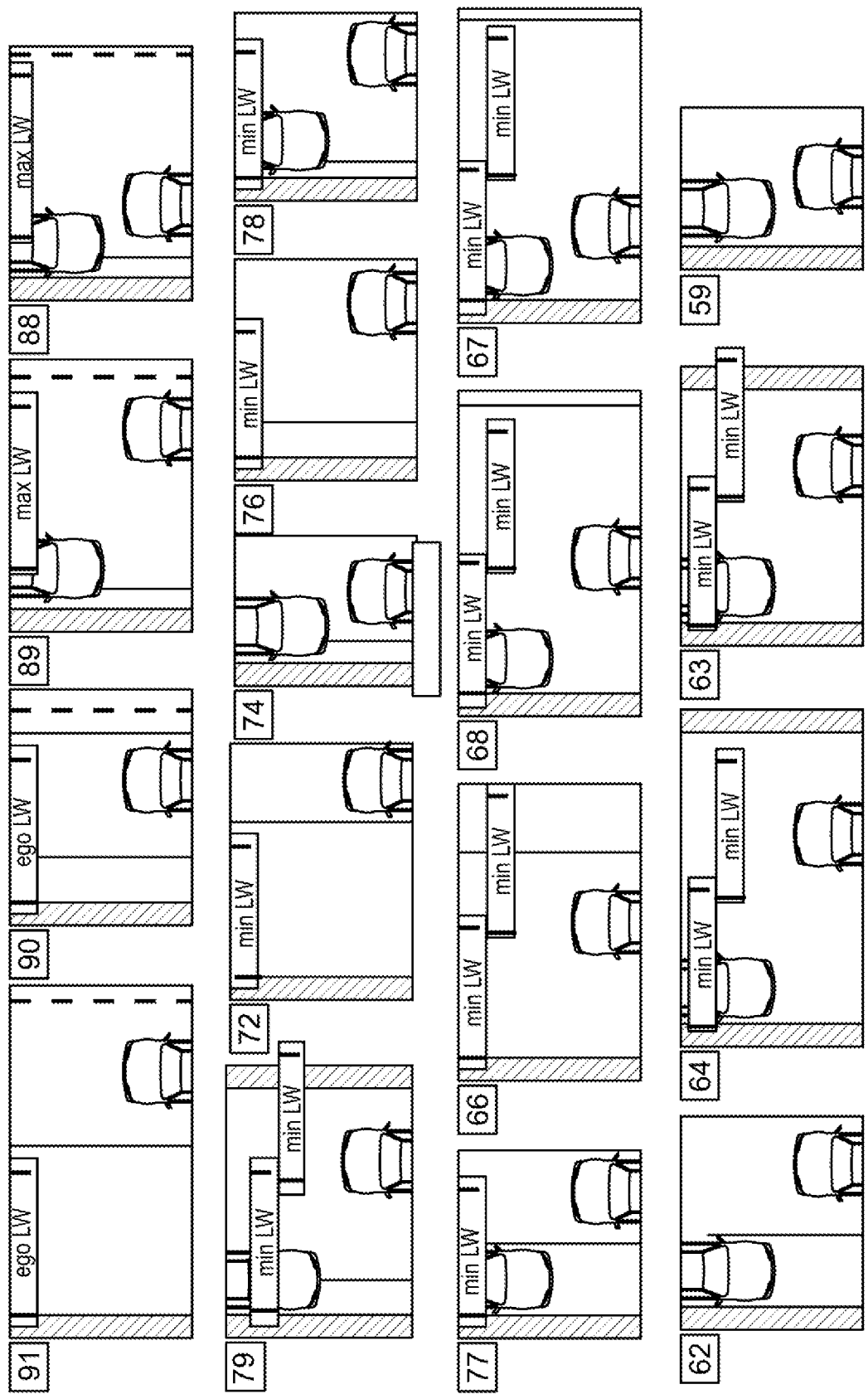
FIG. 15 shows, schematically, top views of roadways to illustrate individual points of the decision tree diagram in FIG. 14.

FIG. 15 illustrates individual driving situations occurring in the tree diagram shown in FIG. 14. A top row relates to a situation in which both lane markings are present. A second row relates to a situation in which only a left-hand lane marking is present. A third row relates to a situation in which only a right-hand lane marking is present, and a fourth row relates to a situation in which no lane marking is present. A minimum lane width is indicated as min LW and, allowing for a safety margin of 0.3 m, can be defined as 2.6 m-0.3 m. A maximum lane width is indicated as max LW and is defined in the following example as 4.6 m. An actual lane width is indicated as ego LW. The actual lane width corresponds to a measured lane width minus a safety margin of 0.3 m. A width of 1.8 m, for example, can be defined as a vehicle width.

The relevant or opposite side depends in principle on a traffic direction, i.e. whether right-hand traffic or left-hand traffic is involved. The following applies in a case of right-hand traffic: a relevant side is a right-hand side, an opposite side is a left-hand side (relevant=right, opposite=left). In a case of left-hand traffic, the relevant side designates a left-hand side, the opposite side, a right-hand side (relevant=left, opposite=right).

A lane width LW between 2.6 and 4.4 m (2.6 m<LW<4.4 m) can be defined as a correct lane width. A width of 3.05 m, possibly minus a reduction factor, can be defined as the minimum lane width. A width of 1.8 m can be defined as the vehicle width.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method to operate a motor vehicle using a driver assistance system, comprising:
    defining, for at least one driver assistance system function, at least one criterion relating to a vehicle environment to adapt the driver assistance system function, wherein the at least one driver assistance system function includes a traffic jam assistance function, a highway assistance function, an ACC stop-and-go function, an active high beam assistance function, and a hands-off driving assistance function;
    detecting features of the vehicle environment;
    estimating a probability of occurrence of at least one criterion responsive to a combination of the features;
    adapting the driver assistance system function based on the probability of occurrence of the at least one criterion, wherein the driver assistance system function is further configured to control the hands-off driving assistance function to be unavailable for one of a specified time and specified distance in response to the probability of occurrence of the at least one criterion; and
    indicating to a driver a warning signal that informs the driver of an end of availability of the hands-off driving function, and modifying a time between the warning signal and a further warning signal based on the estimated probability.

2. The method as claimed in claim 1 further comprising adapting the driver assistance system function in response to one of the probability of occurrence of the at least one criterion falling below or exceeding a threshold value.

3. The method as claimed in claim 1, wherein adapting the driver assistance system function entails defining, as available, the driver assistance system function.

4. The method as claimed in claim 1, wherein the at least one criterion is defined using at least one sensor that detects at least one feature of the vehicle environment.

5. The method as claimed in claim 4, wherein the at least one sensor includes an ultrasound sensor, a radar sensor, a camera, a lidar sensor, a sonar sensor, and a sensor that acquires electronic horizon information.

6. The method as claimed in claim 1, wherein the at least one criterion comprises:
an occurrence of oncoming traffic,
a permissibility of pedestrian traffic on a roadway,
a presence of pedestrians on the roadway,
a permissibility of two-wheeled traffic on the roadway, and
a presence of two-wheeled vehicles on the roadway.

7. The method as claimed in claim 1, wherein the features of the vehicle environment include:
a speed of the motor vehicle exceeding a threshold value, and
a target speed of the motor vehicle exceeding a threshold value, or
presence of at least one detected pedestrian, and
presence of at least one detected bicycle, and
presence of at least one detected motorcycle, and
presence of at least one detected moped, and
presence of at least one detected motor scooter, or
presence of detected oncoming traffic, and
presence of a lateral distance from the motor vehicle to oncoming traffic exceeding a threshold value, or
presence of a structural division between roadways, and
presence of a road edge, or
presence of an occupied adjacent lane, and
presence of a double traffic lane demarcation, and
presence of a detected highway road sign, and
presence of a detected speed limit sign.

8. The method as claimed in claim 1, further comprising combining the features including a presence of at least one detected pedestrian, no presence of detected oncoming traffic, a presence of the lateral distance from the motor vehicle to oncoming traffic exceeding a threshold value, a presence of a structural division between roadways and a presence of a road edge, and a presence of an occupied adjacent lane to adapt the traffic jam assistance function and the highway assistance function.

9. The method as claimed in claim 1 further comprising combining the features including a presence of at least one detected pedestrian, a presence of at least one detected bicycle, a presence of at least one detected motorcycle, moped, motor scooter, and scooter, and a presence of at least one detected highway sign to adapt the ACC stop-and-go function.

10. The method as claimed in claim 1 further comprising combining the features to distinguish between environments of the motor vehicle located inside or outside a built-up area for adaptation of an active high-beam assistance function.

11. A device that adapts at least one driver assistance system function of a motor vehicle comprising:
a control unit configured to, according to defined criteria relating to a vehicle environment for at least one driver assistance system function from a driver assistance system and in response to detected environment features of the vehicle environment, adapt the driver assistance system based on an estimate of an occurrence probability of criteria from a combination of the environment features, indicate to a driver a warning signal that informs the driver of an end of availability of a hands-off driving assistance function, and modify a time between the warning signal and a further warning signal based on the estimated probability;
wherein the at least one driver assistance system function includes a traffic jam assistance function, a highway assistance function, an ACC stop-and-go function, an active high beam assistance function, and the hands-off driving assistance function; and
wherein the driver assistance system function is further configured to control the hands-off driving assistance function to be unavailable for one of a specified time and specified distance in response to the occurrence probability of criteria.

12. The device as claimed in claim 11 further comprising at least one sensor that detects the environment features.

13. The device as claimed in claim 11, wherein the environment features include a presence of a detected pedestrian, no presence of detected oncoming traffic, a presence of a lateral distance to oncoming traffic exceeding a threshold value, a presence of a structural division between roadways and a road edge, and a presence of an occupied adjacent lane, wherein a traffic jam assistance function and a highway assistance function are adapted by the control unit.

14. The device as claimed in claim 13, wherein the environment features are combined to distinguish between environments of the motor vehicle located inside or outside a built-up area for adaptation of an active high-beam assistance function.

15. A vehicle comprising:
a driver assistance system that controls a vehicle trajectory, the driver assistance system having at least one driver assistance system function, the at least one driver assistance system function including a traffic jam assistance function, a highway assistance function, an ACC stop-and-go function, an active high beam assistance function, and a hands-off driving assistance function;
a plurality of sensors configured to detect features of a vehicle environment; and
a control unit configured to, in response to defined criteria relating to the vehicle environment, for the driver assistance system and detected features of the vehicle environment, adapt the driver assistance system based on an estimate of an occurrence probability of criteria from a combination of the detected environment features to control the vehicle along the trajectory, indicate to a driver a warning signal that informs the driver of an end of availability of the hands-off driving function, and modify a time between the warning signal and a further warning signal based on the estimate of the occurrence probability;
wherein the driver assistance system function is further configured to control the hands-off driving assistance function to be unavailable for one of a specified time and specified distance in response to the occurrence probability of criteria.

16. The vehicle as claimed in claim 15, wherein the detected environment features include a presence of a detected pedestrian, no presence of detected oncoming traffic, a presence of a lateral distance to oncoming traffic exceeding a threshold value, a presence of a structural division between roadways and a road edge, and a presence of an occupied adjacent lane, wherein a traffic jam assistance function and a highway assistance function are adapted by the control unit to control the vehicle along the trajectory.

17. The vehicle as claimed in claim 16, wherein the detected environment features are combined to distinguish between environments of the vehicle located inside or outside a built-up area for adaptation of an active high-beam assistance function along the trajectory.

18. The method of claim 1 further comprising inferring a presence of the at least one criterion from preceding detected measurements when an extended hands-off driving time is greater than a prediction time for detected features of the vehicle environment.

19. The method of claim 7 further comprising, following detection of the features of the vehicle environment, resetting the at least one criterion if no further detection occurs within one of a specified time period and a specified distance.

* * * * *